United States Patent [19]
Lee

[11] Patent Number: 6,141,321
[45] Date of Patent: *Oct. 31, 2000

[54] METHOD AND APPARATUS FOR THE EFFICIENT PROCESSING OF ABR CELLS IN AN ATM SWITCH

[75] Inventor: Denny L. S. Lee, Kanata, Canada

[73] Assignee: Alcatel Networks Corporation, Kanata, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/889,438

[22] Filed: Jul. 8, 1997

[51] Int. Cl.[7] .................................................. H04J 1/16
[52] U.S. Cl. .................................... 370/229; 370/236
[58] Field of Search .................................. 370/230, 232, 370/233, 234, 235, 395, 397, 229, 236, 410, 468, 409

[56] References Cited

U.S. PATENT DOCUMENTS

| | | | |
|---|---|---|---|
| 5,453,979 | 9/1995 | Schibler et al. | 370/60.1 |
| 5,515,359 | 5/1996 | Zheng | 370/13 |
| 5,574,720 | 11/1996 | Lee | 370/17 |
| 5,701,291 | 12/1997 | Roberts | 370/232 |
| 5,754,530 | 5/1998 | Awdeh et al. | 370/232 |
| 5,777,984 | 7/1998 | Gun et al. | 370/230 |
| 5,812,550 | 9/1998 | Sohn et al. | 370/395 |
| 5,828,651 | 10/1998 | Jang et al. | 370/219 |
| 5,852,601 | 12/1998 | Newman et al. | 370/230 |

FOREIGN PATENT DOCUMENTS

| 374 928 | 6/1990 | European Pat. Off. | H04L 12/56 |
|---|---|---|---|

OTHER PUBLICATIONS

Krishnan R: "Rate–Based Control Schemes for ABR Traffic–Design Principles and Performance Comparison"—Computer Networks and ISDN Systems, NL, North Holland Publishing, Amsterdam—vol. 29, No. 5—pp. 583–593 XP000686168, ISSN: 0169–7552.

Shivkumar Kalyanaraman et al; "Virtual Source/Virtual Destination (VS/VD): Design Considerations"; ATM Forum Document/96–1759, Dec. '96.

Hiroshi Saito et al; "Performance Issues in Public ABR Service"; —IEEE Communications Magazine pp. 40–48, Nov. 1996.

ATM Forum Technical Committee; "Traffic Management Specification"; Version 4.0, Apr. 1996.

*Primary Examiner*—Chau Nguyen
*Assistant Examiner*—Chiho Andrew Lee
*Attorney, Agent, or Firm*—Marks & Clerk

[57] ABSTRACT

An apparatus and method for processing multiple cell streams of differing service categories at a queuing point in an ATM network. The apparatus includes two or more cell processors for monitoring bi-directional ABR traffic at each queuing point in order to efficiently calculate and mark explicit rate values and/or congestion information in resource management cells in either VSVD or non-VSVD ABR traffic.

17 Claims, 3 Drawing Sheets

METHOD AND APPARATUS FOR THE EFFICIENT PROCESSING OF ABR CELLS IN AN ATM SWITCH

FIELD OF THE INVENTION

This invention relates to apparatus and methods for processing multiple cell streams at a queuing point in an ATM network and more particularly multiple cell processors for monitoring bi-directional ABR traffic at the queuing point in order to efficiently calculate and mark explicit rate values and/or congestion information in resource management cells.

BACKGROUND

Asynchronous transfer mode (ATM) is rapidly becoming the technology of choice for broadband information transport. The ability of an ATM network to effectively transmit voice, video and data has played a major role in the wide acceptance of the technology. Of particular importance is the ability of ATM to carry bandwidth on demand (BOD) traffic which is typified by today's local area network (LAN) traffic. In light of applications such as these the concept of rate-based flow control is introduced to ensure the BOD traffic can retain its inherent bursty nature and yet allow for an efficient usage of network resources. One such rate-based flow control scheme as adopted by the ATM Forum is the available bit rate (ABR) service category. It is therefore important for ATM switches to support such ABR traffic to ensure a high performance in switch capacity utilization.

The ABR rate-based flow control scheme is based on a feedback control loop which utilizes bi-directional cell flows for traffic management. Since ATM cell traffic is comprised of various service categories with different quality of service guarantees, network elements are required to switch traffic streams through nodes in the switch fabric. This traffic control results in the creation of queuing points within the network elements in order to accommodate the bursty nature of traffic streams. To accommodate ABR rate-based traffic while optimizing utilization of available bandwidth, mechanisms are required to detect potential congestion at these queuing points within the network elements. ABR traffic streams include periodically transmitted resource management cells which are marked with congestion information. The resource management (RM) cells travel through network elements between the network source to the network destination, the resource management cells being marked with congestion information en route. At the destination the ABR traffic including resource management cells are returned to the source where the congestion information is used to control the flow rate of subsequent cell traffic. The feedback information can be in the form of an explicit rate (ER) marking or a congestion indicating bit (relative rate marking) as specified by the ATM Forum. The congestion information, as indicated previously, is carried in both a forward and backward direction. Being a feedback control system in nature, large network delays would tend to degrade the performance of ABR traffic in terms of steady-state utilization and convergence time. In order to reduce network delay the concept of virtual source, virtual destination (VSVD) has been introduced. This concept segregates an otherwise long feedback control loop into multiple shorter loops thus allowing a better overall utilization of network bandwidth.

Current VSVD architectures call for brute force implementation using high computational power RISC-based processors and/or specially designed digital hardware (VLSI). Such centralized solutions are of high complexity, power, cost and usually do not scale well.

SUMMARY OF THE INVENTION

It is an object of the present invention to provide an efficient mechanism to process bi-directional traffic in light of its feedback control nature.

It is a further object of the present invention to support multiple concurrent, multiplexed ABR cell flows which are generic enough to support both VSVD and non-VSVD ABR traffic.

It is a further object of the invention to address the need to efficiently propagate information bi-directionally between two opposite flows.

It is a still further object of the present invention to provide an architecture which allows scaleability so as to support various interface speeds.

Therefore, in accordance with a first aspect of the present invention there is provided in an ATM network for transporting multiple cell streams from a network source to a network destination, an apparatus for controlling bi-directional ABR traffic at a queuing point within an ATM switch. The apparatus comprises a first cell processor for receiving and processing the multiple cell streams, for monitoring ABR traffic for congestion and for calculating an explicit rate (ER) value with respect to bandwidth available to ABR traffic.

A second cell processor is provided for returning ABR cells to the source and to mark the ER value in the return cells. A bi-directional link is connected between the first and second cell processors for communicating information therebetween.

In a second embodiment a third processor is provided in series with a first cell processor and a fourth cell processor is provided in series with the second cell processor, so that the first and third cell processors handle ABR traffic in one direction while the second and fourth cell processors handle traffic in the opposite direction.

In accordance with a second aspect of the present invention there is provided a method of processing multiple cell streams including bi-directional ABR traffic at a queuing point in an ATM network having a source and a destination. The method comprises: providing the multiple cell streams to a first cell processor whereat the ABR traffic is monitored for congestion; dynamically calculating an explicit rate value respecting available bandwidth for the ABR traffic; and communicating the ER value to a second cell processor for marking the ER value in resource management cells in the ABR traffic for transport to the source.

BRIEF DESCRIPTION OF THE DRAWINGS

The invention will now be described in greater detail with reference to the attached drawings wherein.

DETAILED DESCRIPTION OF THE INVENTION

Figure 1:
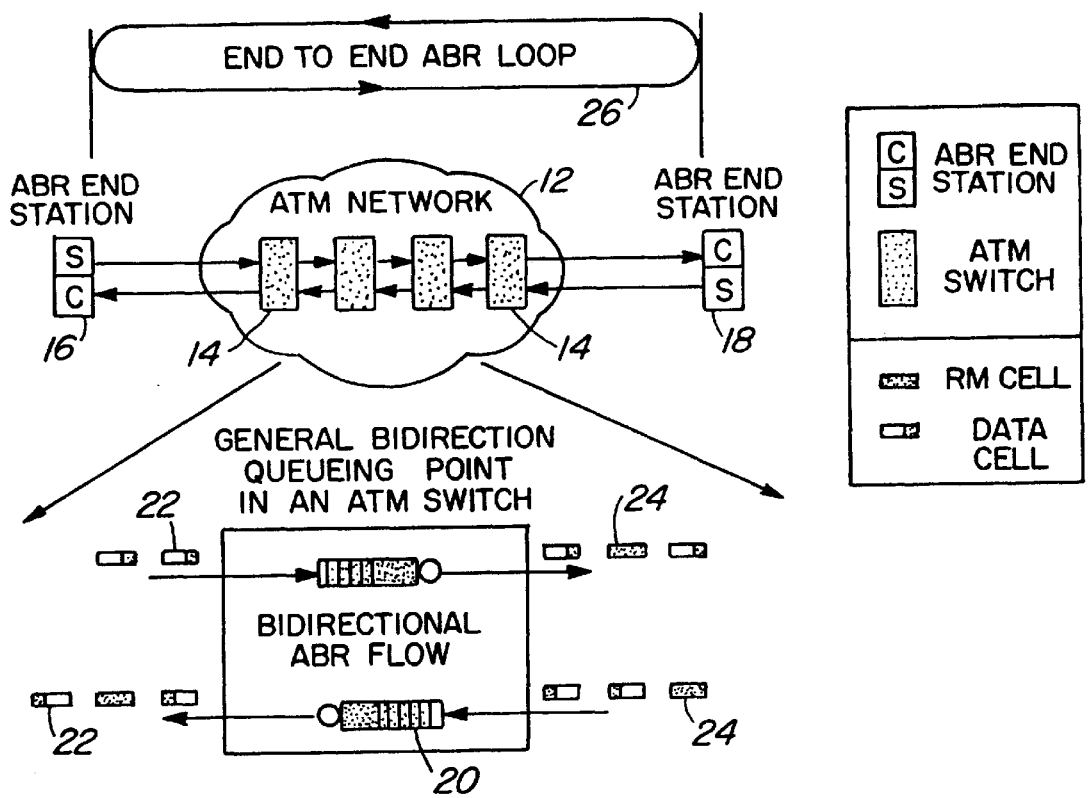
FIG. 1 illustrates bi-directional ABR flow in an ATM network.

FIG. 1 depicts the conceptual environment in which the design of the present invention operates. For the purpose of the following description, the term ATM switch refers generally to an entity that performs ATM cell switching. Due to the statistical multiplexing nature of ATM, most ATM switches contain one or more queuing points. These queuing points are potential congestion locations where multiple cell streams converge. As discussed previously, these cell streams can be of different service categories. The objective of ABR flow control is to maximize bandwidth utilization at these congestion points while maintaining a reasonably low end-to-end cell loss ratio (CLR). As shown in FIG. 1 the ATM network 12 includes a plurality of network elements 14 for transporting cell traffic including ABR traffic from one ABR end station 16, which will be considered the source, to ABR end station 18 which in FIG. 1 is the destination. As shown in FIG. 1 each network element 14 will include one or more queuing points containing buffers 20 for multiplexing traffic streams. Both the forward and backward cell traffic include data cells 22 and resource management cells 24. Information pertaining to congestion at the queuing point is marked in the resource management cell and is returned to the source for updating flow rate information. The returned congestion information may indicate that congestion exists in which case the source will be instructed to reduce transmission of cell traffic. Alternatively, the congestion information may indicate that the system is at its capacity and that the cell rate should neither increase nor decrease. Finally, if available bandwidth does exist the resource management cell will include an explicit rate (ER) indication in which case the cell traffic from the source will be increased.

Figure 2:
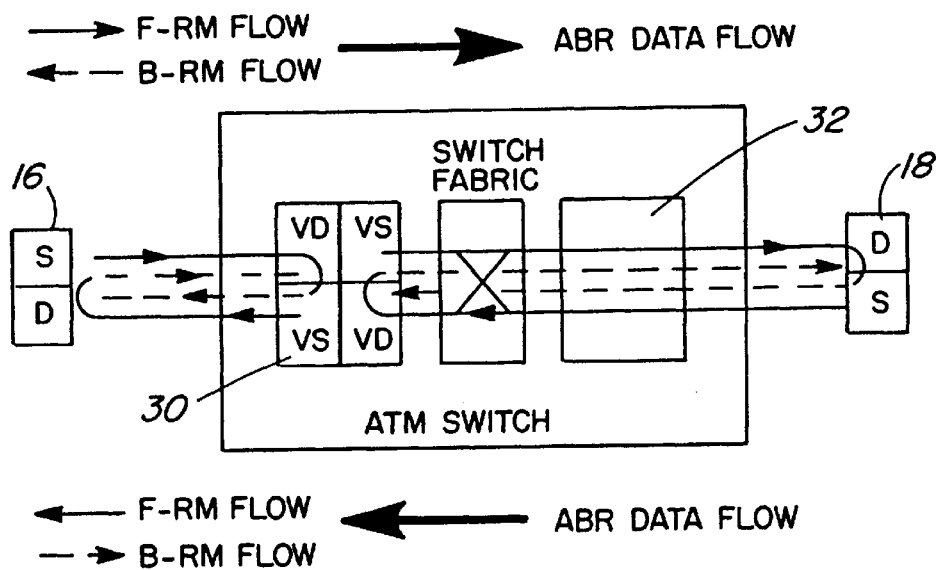
FIG. 2 illustrates deployment of bi-directional VSVD within an ATM switch.

As shown in FIG. 1, the feedback loop 26 extends from the source 16 to the destination 18. As previously discussed this long loop can lead to undesirable delays. In an attempt to overcome these delays the concept of virtual source, virtual destination solution has emerged. This is illustrated in FIG. 2 wherein each or selected network elements 30 include architecture which allows it to be both a virtual source and a virtual destination. Hence, network element 30 is seen as a virtual destination for ABR traffic from source 16 and a virtual source for destination 18. Since the ABR traffic is bi-directional, network element 30 also acts as a virtual source for end station 16 and as a virtual destination for end station 18. As will be apparent, network element 32 could also include VSVD architecture to further shorten the feedback loops.

The usage of VSVD in ABR traffic by shortening the feedback loop and hence the feedback delay allows performance improvements in network resource utilization. However, the introduction of VSVD complicates the design of ATM switches as the ABR end station source and destination behaviour has to be replicated inside the switch. As will be apparent there is tremendous information exchange between the virtual sources and the virtual destinations and concentrating all of these tasks into one single centralized processing entity incurs a high design complexity especially at current interface speeds. The architecture illustrated in FIG. 3 overcomes these problems by distributing the tasks while maintaining a close coupling path for information exchange between the forward and backward direction thus allowing the solution to scale up to relatively high interface speeds.

Figure 3:
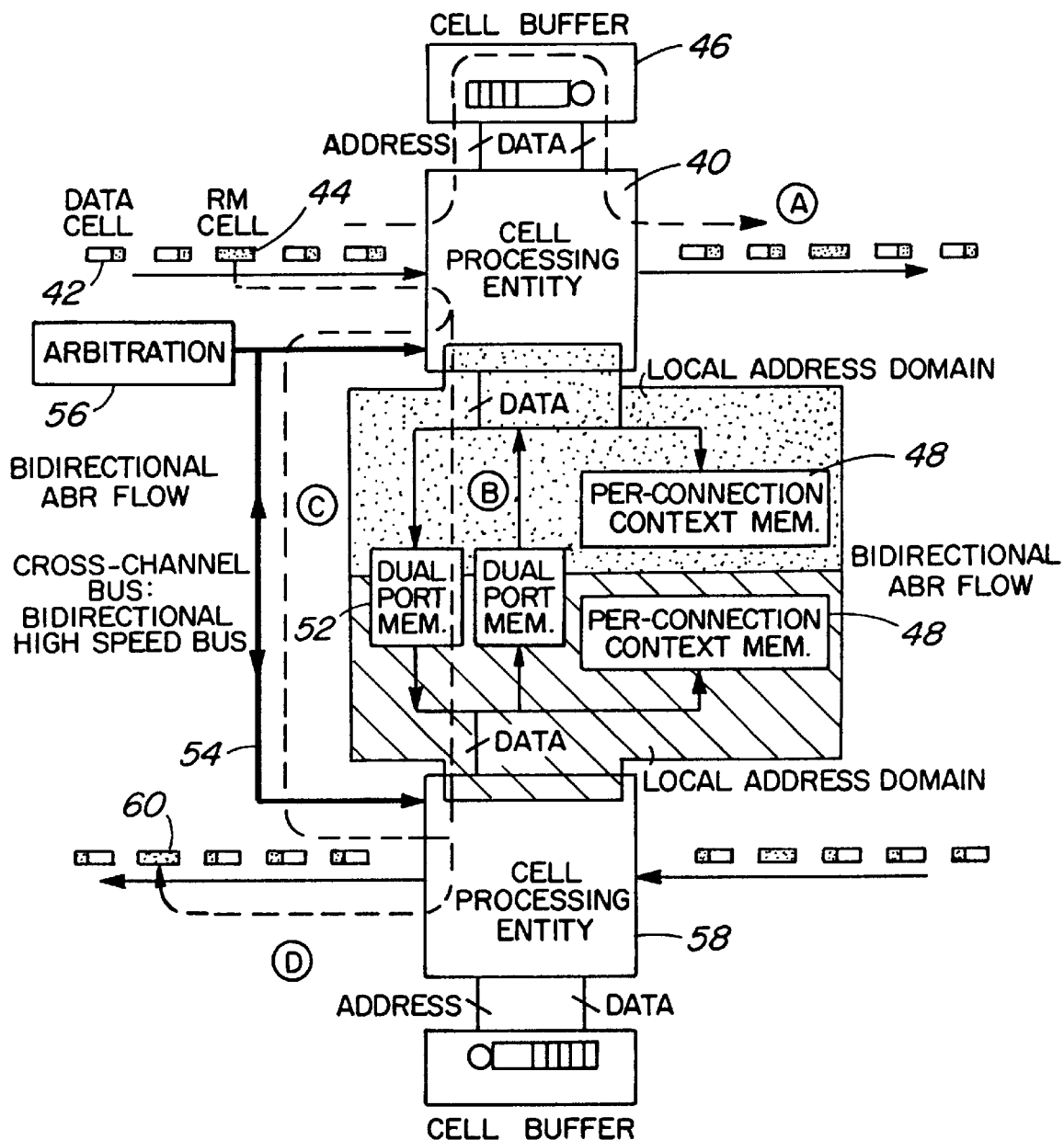
FIG. 3 is an architectural design for bi-directional ABR traffic flow in accordance with the present invention.

As shown in FIG. 3, this architectural design is highly symmetrical which allows a high degree of design reuse. The design contains several key items which are described in further detail below. Within FIG. 3, the key data paths are shown. Note that the data paths highlighted are only for handling ABR flow in one direction only. The opposite flow is handled in a symmetrical fashion.

The cell processing entity (CPE) 40 is a device that performs the appropriate traffic management features on the traversing ATM cell streams comprising data cells 42 and RM cells 44. Handling of ABR flow control is one of its major tasks. Other key features, not necessarily pertaining specifically to ABR traffic type, are for example output cell streams shaping and buffer management. The cell processing entity has three main bus structures:
1) for cell buffering purposes,
2) for per-connection context storage purposes and,
3) for cross-channel information storage purposes. For VSVD application, this CPE must also perform destination behaviour at the input and source behaviour at the output.

The cell buffer memory 46 in this design has its own independent bus structure such that it is not a bottleneck for high throughput application. The CPE 40 can choose to perform aggregate or per-Virtual Connection (per-VC) queuing within this cell buffer memory. In the case of VSVD, since each VC's rate is dynamically changing, each individual VC would need to be per-VC queued to accommodate the varied scheduling rate.

The per connection context memory 48 is the storage space for holding rate and configuration information for each virtual connection (VC). Note that this architecture does not limit the processing to single ABR cell streams. Concurrently multiplexed ABR connections can be easily processed as each connection has its own per-VC context and is managed independently.

The context memory address space is shared amongst several key memory blocks. The per-connection context memory is local to the CPE. As well, to facilitate high speed information exchange between the two CPEs, two banks of dual port memories 52 are used. The two dual port memories 52 are both addressable by both CPEs. Each dual port bank facilitates a unidirectional information exchange and as such ensures that there are no read/write contention issues.

The dual port memories 52 are for high speed information exchange between the opposite CPEs.

Since dual port memory 52 is low density in nature, the bulk of the information exchange between the forward ABR flow and the backward flow would take place over the cross channel high speed bus 54. Since this bus is bi-directional in nature, some arbitration as by arbiter 56 is required to resolve collision.

The mate CPE 58 uses the ER information and marks it onto backward (B) RM cells. In the case of VSVD, it must also perform the appropriate source and destination behaviour in the mate direction.

The following description describes path flow in operation.

Path A: Incoming cell streams are processed by the CPE 40, and are stored onto the cell buffer memory 46 in either an aggregate or per-VC fashion. For ABR cell flow, the CPE 40 also monitors for congestion in buffer and bandwidth usage. Upon detection of congestion, the CPE recalculates a local Explicit Rate (ER) value for each congesting ABR connection.

Path B: The ER value and/or congestion indication (CI) bit must be propagated to the mate CPE 58. The originating CPE 40 can write the ER and/or CI bit value through the dual port memory 52. This path allows speedy information exchanges between the CPEs 40, 58 thus minimizing feedback delay of congestion indication.

Path C: The high speed bi-directional cross channel bus 54 provides another path for information exchange. Due to the nature of the bus, the exchange speed might not be as fast as path B. However, it offers an efficient path for bulk information exchange which is useful in VSVD application as RM information must be turned around from the forward to the backward direction in addition to the internal ER value described in path A.

Path D: Forward direction RM and ER information are then processed by the mate CPE 58 and are marked onto the backward RM cells 60 in the opposite flow direction.

Figure 4:
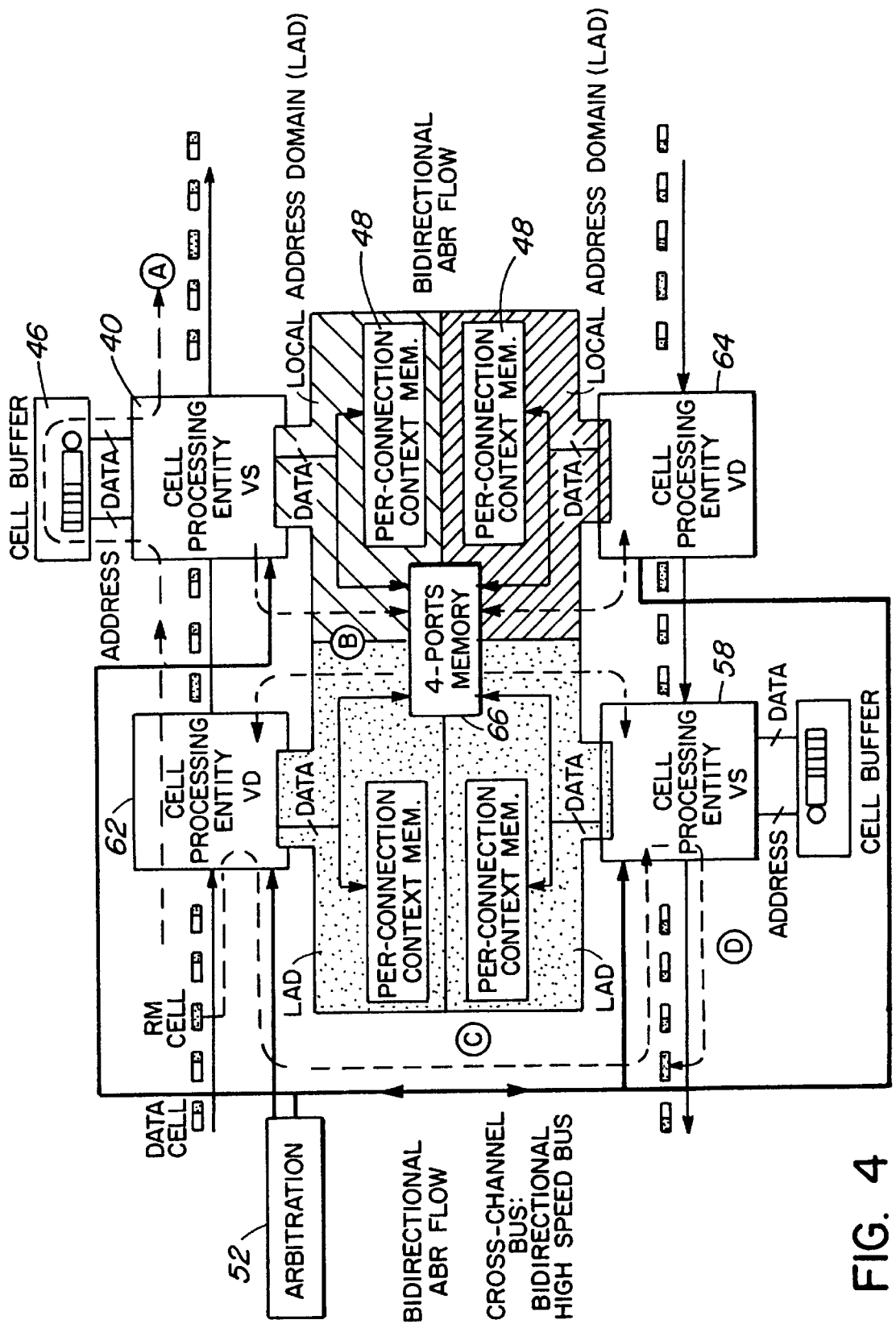
FIG. 4 illustrates a second embodiment of the present invention.

One important element of this design is its scaleability to accommodate the various interface speeds in today's ATM network. At higher interface speed (cell flow rate), a single CPE per direction might not have sufficient computational power to sustain the throughput. For instance, if one increases the throughput requirement from OC3 (~150 Mbps) to OC12 (~600 Mbps) rate, one would have to scale the computational power of the CPE linearly by 4 times. While this might be feasible, it tends to increase the complexity, cost and power by a large order of magnitude. The architectural design addresses this problem by taking advantage of the highly symmetrical nature of ABR flow control. For instance, by recognizing that VSVD is the bulk of ABR flow control's complexity and its highly symmetrical nature, the processing tasks are distributed to multiple CPEs with approximately the same order of complexity. The architecture can then be easily scaled to accommodate higher speed interface. FIG. 4 depicts a variant of the architecture which can support bi-directional ABR flow control at high interface speed.

The enhancements from the original architecture is highlighted by the additional processors such that each direction now has two cell processing entities (CPE 40, 62, 58, 64). The CPE 40 now only needs to support VS (ABR source) behaviour thus allowing the architecture to sustain a higher rate of throughput without incurring a large complex VLSI or a high power RISC processor design.

The memory functionality remains the same except that each CPE could have its own per-connection context memory. The usage of 4-ports memory 66 adopted from the original concept ensures a high-speed communication path between the various CPEs. Such technology is available today which allows non blocking access to shared information. An additional CPE 62, 64 is introduced per direction. The CPE 62 can be of the same level of complexity as the original CPE 40 in FIG. 3. This CPE 62 serves as an assistance to the buffer (queuing) CPE 40. In the case of ABR VSVD application, it serves to support the VD (ABR destination) behaviour. In general ABR application in which explicit rate (ER) marking is supported, CPE 62 is also used to calculate the local explicit rate. The introduction of this CPE allows load balancing amongst various processing entities within the architecture. Note that only the leading CPE 40 has cell buffering capability. The CPE 62 must pass the cell streams along as they traverse the device. Since ABR's information is mostly contained in RM cells, this CPE is most operative when RM cells are received.

This architecture provides the following characteristics:
a) Horizontal partitioning such that cell processing tasks are partitioned along each data flow direction. A cell stream can flow through single or multiple CPE devices allowing it to be processed (queuing, shaping, buffer and bandwidth management) easily;
b) Multiport memories for critical, real time information sharing provides the ability for higher speed operation;
c) Common bus for larger volume (less real time critical) information sharing provides improved efficiency;
d) Highly symmetrical and scaleable; and
e) Loads are distributed for more manageable complexity.

While certain embodiments have been described and illustrated it will be apparent that additional changes to the basic concept can be implemented. It is anticipated, however, that such changes, to the extent possible, will fall within the scope of the present invention as defined by the appended claims.

What is claimed is:

1. A system for processing multi-service category cell streams including bi-directional ABR traffic at a switching node between a source end system and a destination end system within an ATM communication network, said system comprising:

first processing means in said switching node to monitor incoming ABR traffic for congestion, and to calculate an explicit rate (ER) congestion value for said ABR traffic;

second processing means in said switching node to receive said ER value from said first processing means and to selectively insert said ER value in backward flowing ABR Resource Management cells, said first and second processing means being symmetrical; and a high speed communication link connected between said first and second processing means for bi-directionally communicating ER information between said first and second processing means, said communication link having multiple paths at least one path being a direct high speed bidirectional bus; wherein said first and second processing means support both Virtual Source/Virtual Destination (VSVD) and non-VSVD traffic.

2. A system as defined in claim 1 wherein said first processing means queues said cell streams into cell stream memory buffers in an aggregate fashion.

3. A system as defined in claim 1 wherein said first processing means queues said cell streams into cell stream memory buffers in a per virtual connection fashion.

4. A system as defined in claim 1 wherein said second processing means marks a congestion indication (CI) in said backward flowing ABR Resource Management cell when congestion exceeds a preset threshold.

5. A system as defined in claim 1 wherein said first processing means acts as a virtual destination for said source end system and as a source for said destination end system and said second processing means acts as a virtual source for said source end system and as a virtual destination for said destination end system.

6. A system as defined in claim 5 wherein said high speed communication link utilizes a pair of unidirectional dual port memories for conveying congestion information between said first processing means and said second processing means.

7. A system as defined in claim 1 wherein said communication link comprises a high speed, cross channel bi-directional bus for conveying congestion information between said first processing means and said second processing means.

8. A system as defined in claim 1 wherein said first processing means comprises first and second processors and said second processing means comprises third and fourth processors.

9. A system as defined in claim 8 wherein said communication link utilizes a four port memory for conveying congestion information between said first and second processing means.

10. A system as defined in claim 7 wherein said bi-directional bus includes arbitration means.

11. A method of processing multiple cell streams, including bi-directional ABR traffic, at a switching node in an ATM communications network between a source end system and a destination end system, said method comprising:

providing said multiple cell streams to a first processing means in said switching node whereat said ABR traffic in a forward direction is monitored for congestion;

dynamically calculating an explicit rate (ER) value respecting bandwidth available for said ABR traffic; and communicating said ER value to a second processing means through a bi-directional communication link having multiple paths at least one path being a direct high speed bidirectional bus at said switching node for marking said ER value in resource management cells in backward flowing ABR traffic for transport to said source end system whereat said ER value is used to control cell output rate, wherein said first and second processing means are symmetrical and support both Virtual Source/Virtual Destination (VSVD) and non-VSVD traffic.

12. A system as defined in claim 8 wherein said first processor act as a virtual destination for said source end system, said second processor acts as virtual source for said destination end system, said third processor acts as a virtual source for returned RM cells from said destination end system and said fourth processor acts as a virtual source for said source end system.

13. A system as defined in claim 12 wherein said ATM network includes a plurality of switching nodes between said source end system and said destination end system, each having first and second processing means supporting VSVD and non-VSVD ABR traffic.

14. The method according to claim 11 wherein said ER value is communicated bi-directionally between said first processing means and said second processing means through a multi-port memory.

15. The method according to claim 14 wherein said first processing means serves as a virtual destination for ABR traffic from said source end system and a virtual source for said destination end system and said second processing means serves as a virtual destination for ABR traffic returned by said destination end system and as a virtual source for ABR traffic forwarded to said source end system.

16. The method according to claim 15 wherein said first processing means includes first and second processors wherein said first processor serves as a virtual destination for ABR traffic from said source end system and said second processor serves as a virtual source for said destination end system and said second processing means includes third and fourth processors wherein said third processor serves as a virtual destination for ABR traffic returned by said destination end system and said fourth processor serves as a virtual source for ABR traffic returned to said source end system.

17. The method according to claim 16 wherein said ATM network includes a plurality of switching nodes between said source end system and said destination end system each of said switching nodes having first and second processing means for supporting both VSVD and non-VSVD ABR traffic.

* * * * *